United States Patent
Elias et al.

(10) Patent No.: US 7,738,401 B2
(45) Date of Patent: Jun. 15, 2010

(54) SYSTEM AND METHOD FOR OVERLAYING A HIERARCHICAL NETWORK DESIGN ON A FULL MESH NETWORK

(75) Inventors: Mark Elias, Eastpointe, MI (US); Sherry Soja-Molloy, Allen Park, MI (US)

(73) Assignee: AT&T Intellectual Property I, L.P., Reno, NV (US)

(*) Notice: Subject to any disclaimer, the term of this patent is extended or adjusted under 35 U.S.C. 154(b) by 686 days.

(21) Appl. No.: 11/254,523

(22) Filed: Oct. 20, 2005

(65) Prior Publication Data

US 2007/0091910 A1    Apr. 26, 2007

(51) Int. Cl.
    *H04L 12/28* (2006.01)
(52) U.S. Cl. .................. 370/254; 370/406
(58) Field of Classification Search .......... 370/254, 370/255, 400, 401, 406
    See application file for complete search history.

(56) References Cited

U.S. PATENT DOCUMENTS

| | | | |
|---|---|---|---|
| 6,304,609 B1 * | 10/2001 | Stephens et al. | 375/259 |
| 6,470,022 B1 * | 10/2002 | Rochberger | 370/437 |
| 6,493,349 B1 * | 12/2002 | Casey | 370/409 |
| 6,779,051 B1 | 8/2004 | Basil et al. | |
| 7,469,279 B1 * | 12/2008 | Stamler et al. | 709/221 |
| 2002/0172155 A1 | 11/2002 | Kasvand-Harris et al. | |
| 2003/0112755 A1 * | 6/2003 | McDysan | 370/230 |
| 2004/0133619 A1 * | 7/2004 | Zelig et al. | 709/200 |
| 2005/0078668 A1 * | 4/2005 | Wittenberg et al. | 370/389 |
| 2005/0175001 A1 * | 8/2005 | Becker Hof et al. | 370/389 |
| 2005/0213513 A1 * | 9/2005 | Ngo et al. | 370/254 |
| 2006/0198368 A1 * | 9/2006 | Guichard et al. | 370/389 |
| 2006/0291391 A1 * | 12/2006 | Vasseur et al. | 370/235 |
| 2007/0058638 A1 * | 3/2007 | Guichard et al. | 370/395.31 |

* cited by examiner

*Primary Examiner*—Hong Cho
(74) *Attorney, Agent, or Firm*—Ed Guntin; Andrew Gust; Guntin Meles & Gust, PLC

(57) ABSTRACT

A system and method are disclosed for overlaying a hierarchical network on a full mesh network. A system that incorporates teachings of the present disclosure may include, for example, a network element of a full mesh network (402) having a controller programmed to overlay (200, 400, 400) in part a hierarchical network on the full mesh network with an isolation protocol.

21 Claims, 3 Drawing Sheets

SYSTEM AND METHOD FOR OVERLAYING A HIERARCHICAL NETWORK DESIGN ON A FULL MESH NETWORK

FIELD OF THE DISCLOSURE

The present disclosure relates generally to full mesh networks, and more specifically to a system and method for overlaying a hierarchical network on a full mesh network.

BACKGROUND

Full mesh networks as shown in FIG. 1 offer reliability and redundancy. If for instance, a network element can no longer operate, the rest of the network elements can still communicate with each other, directly or through one or more intermediate elements. The chief drawback of a mesh topology is the frequency and volume of communications resulting from routing updates.

Legacy network elements interconnected in a hierarchy of access, distribution, and core layers often do not have the computing and/or storage capacity to process routing updates in high volume as is often encountered in full mesh networks. Consequently, legacy network elements can inadvertently cause traffic congestion and/or packet losses when migrated to a full mesh network such as shown in FIG. 1.

A need therefore arises for a system and method for overlaying a hierarchical network on a full mesh network.

DETAILED DESCRIPTION

Figure 1:
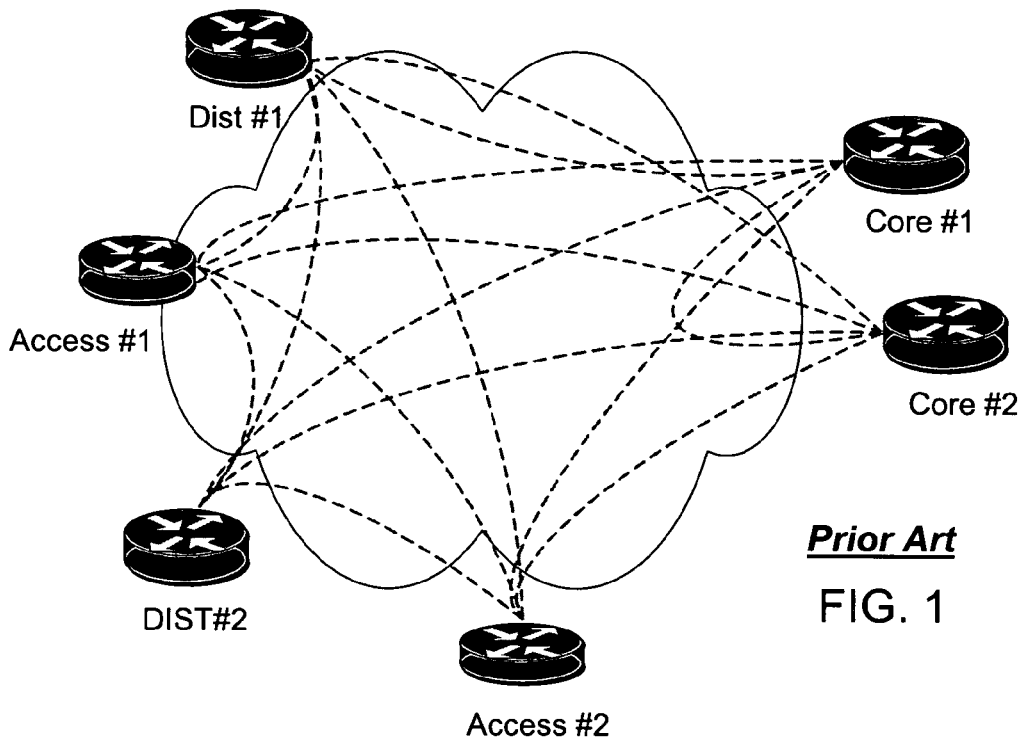
FIG. 1 is a block diagram of a prior art full mesh packet network.
Figure 2:
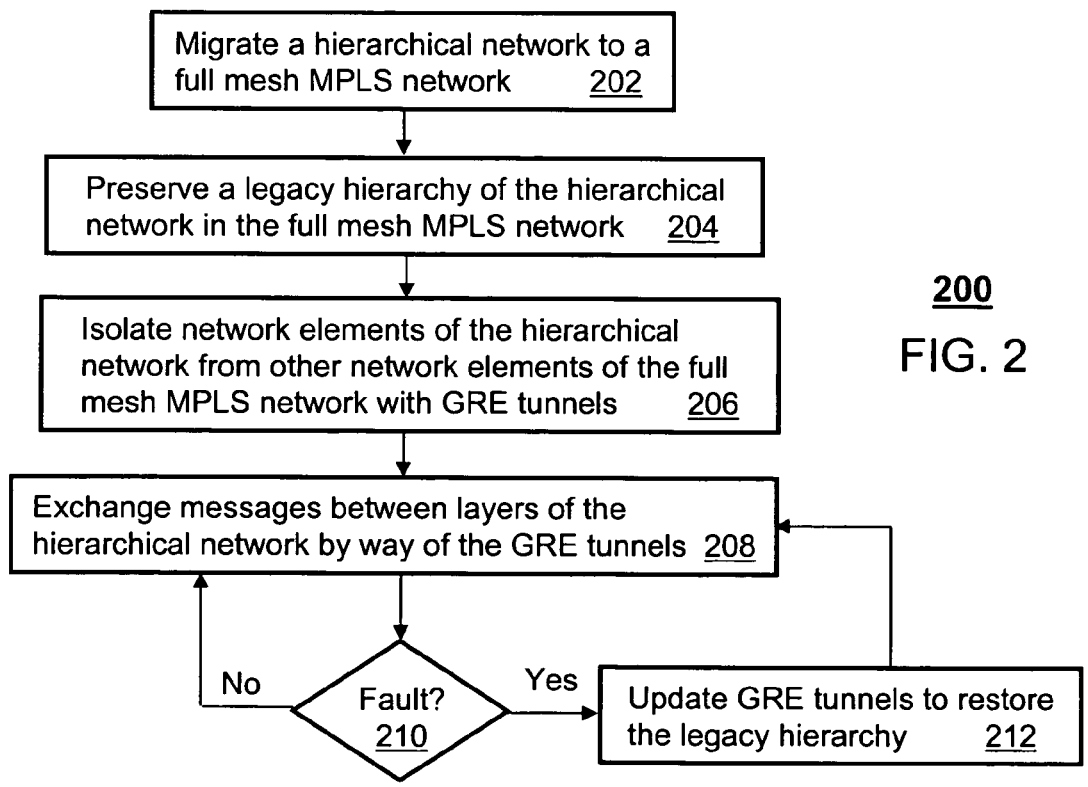
FIG. 2 depicts a flowchart of a method for overlaying a hierarchical network on a full mesh packet network according to teachings of the present disclosure.

FIG. 2 depicts a flowchart of a method 200 for overlaying a hierarchical network on a full mesh packet network according to teachings of the present disclosure. Method 200 describes a process for overlaying a hierarchical network on a full mesh packet network with an isolation protocol applied to a portion of network elements in the full mesh packet network.

Method 200 thus begins with step 202 whereby the hierarchical network is migrated to a full mesh packet network such as an MPLS (Multi-Protocol Label Switching) network. Often customers of hierarchical networks want to preserve a legacy hierarchy as part of the migration process. Thus, the migration process conforms to this need in step 204. In step 206, the network elements of the hierarchical network are isolated from other network elements of the full mesh MPLS network with an isolation protocol such as the well-known GRE (Generic Routing Encapsulation) tunneling protocol established by Cisco Systems, Inc. It would be appreciated by those with ordinary skill in the art that any other isolation protocol existing at the time of this disclosure or in the future can be applied to the present disclosure. The GRE tunneling protocol will be the focus of the proceeding discussion for illustration purposes only, and should not be viewed as limiting the scope of the present disclosure.

The hierarchical network elements operating with GRE tunneling are isolated from routing updates produced by other network elements not associated with the legacy hierarchy. In addition, the hierarchical network elements operating with GRE tunnels do not broadcast routing updates to the rest of the full mesh network. Accordingly, the hierarchical network elements can exchange messages between the layers of the legacy hierarchy in step 208 much like they did prior to the migration. If a network fault is detected in step 210 in one or more of the GRE tunnels, the full mesh architecture of the MPLS network allows for recovery by updating in step 212 one or more of the preceding GRE tunnels to alternate GRE tunnels to mitigate the fault. This step can be performed by common automation means (such as by way of a network management system managing the legacy hierarchy in cooperation with the MPLS network) or manually by service personnel of the MPLS network or the hierarchical network of a particular customer.

Figure 3:
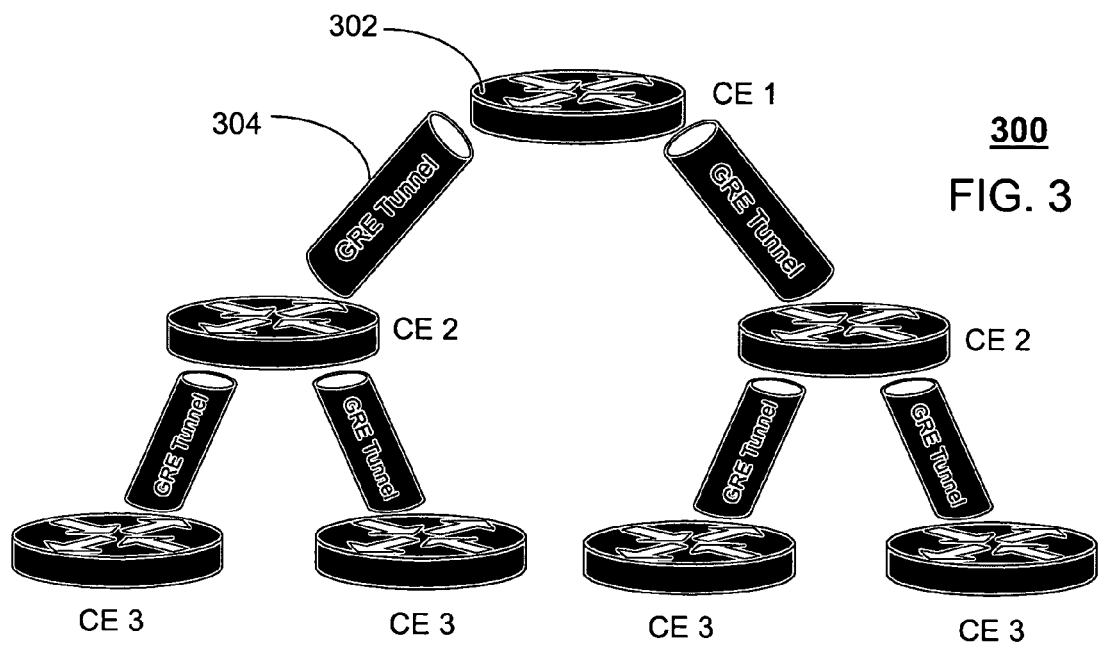
FIG. 3 is a block diagram of a network that preserves a legacy hierarchy utilizing GRE (Generic Routing Encapsulation) tunnels according to teachings of the present disclosure.

FIG. 3 is a block diagram of a network 300 that preserves a legacy hierarchy utilizing GRE tunnels according to teachings of the present disclosure. Each network element 302, represented here as customer edge (CE) routers, is coupled hierarchically to another network element by way of a GRE tunnel 304. CEs 3 represent an access layer of the network, while CEs 2 and CE 1 represent a distribution and core layer, respectively. The access layer is where most of the customer interfaces exist. For example, an access layer can be coupled to restaurants in a franchise (e.g., McDonalds). The distribution layer serves as hubs to a number of these restaurants. The distribution layer connects to the core layer serving much like franchise's headquarters facility or primary center for data collection and communication exchange between the CEs.

Because of this hierarchy, the access routers (CEs 3) do not require a lot of complexity in computing or storage capacity since each is tailored for the needs of a particular restaurant. The distribution routers, on the other hand, require more capacity and computing resources since it serves several restaurants. The core router requires yet more computing and storage capacity. Typically, the ratio of complexity, and cost between the access, distribution and core layer router can vary by orders of magnitude.

Figure 4:
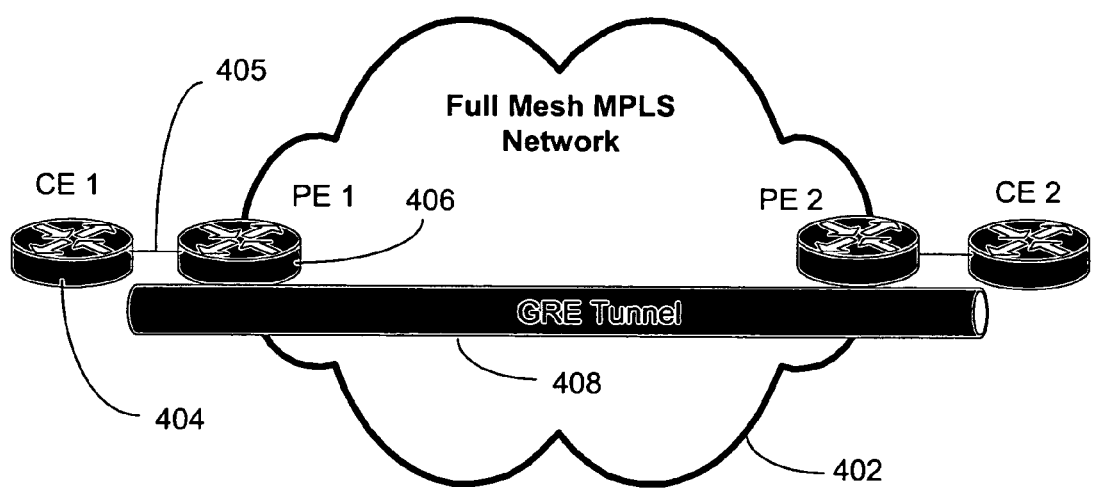
FIG. 4 is a block diagram of a partial overlay of the hierarchical network of FIG. 3 on a full mesh packet network according to teachings of the present disclosure.

FIG. 4 is a block diagram of a partial overlay of the hierarchical network of FIG. 3 on a full mesh MPLS packet network 402 according to teachings of the present disclosure. In this diagram, a CE router 404 is coupled to a PE router 406 of the MPLS network by way of a static routing protocol link 405. An end-to-end GRE tunnel 408 is created between CEs routers 1 and 2. By way of the GRE tunnel 408, CE routers 1 and 2 are isolated from other network elements of the full mesh MPLS network 402. Similarly, routing updates as well as communications taking place between the CE routers is kept isolated from network elements dissociated from the GRE tunnel 408. If a fault occurs in the first instance of the GRE tunnel 408, an alternate GRE tunnel can be established to bypass the fault as described earlier.

Thus in a full mesh MPLS network 408 such as shown in FIG. 4, a number of network elements each having a controller (such as a microprocessor and/or Digital Signal Processor with associated memory—not shown) can be programmed to perform its part in creating the hierarchical network of FIG. 3 in accordance with the steps of method 200. This architecture thus provides not only the added benefit of reusing legacy routers which do not have the resources for a full mesh network environment, but also provides a means for securing confidential communications from others sharing the MPLS network 400. This security can be further enhanced with the establishment of a VPN (Virtual Private Network) connection between the CE routers 1 and 2.

Figure 5:
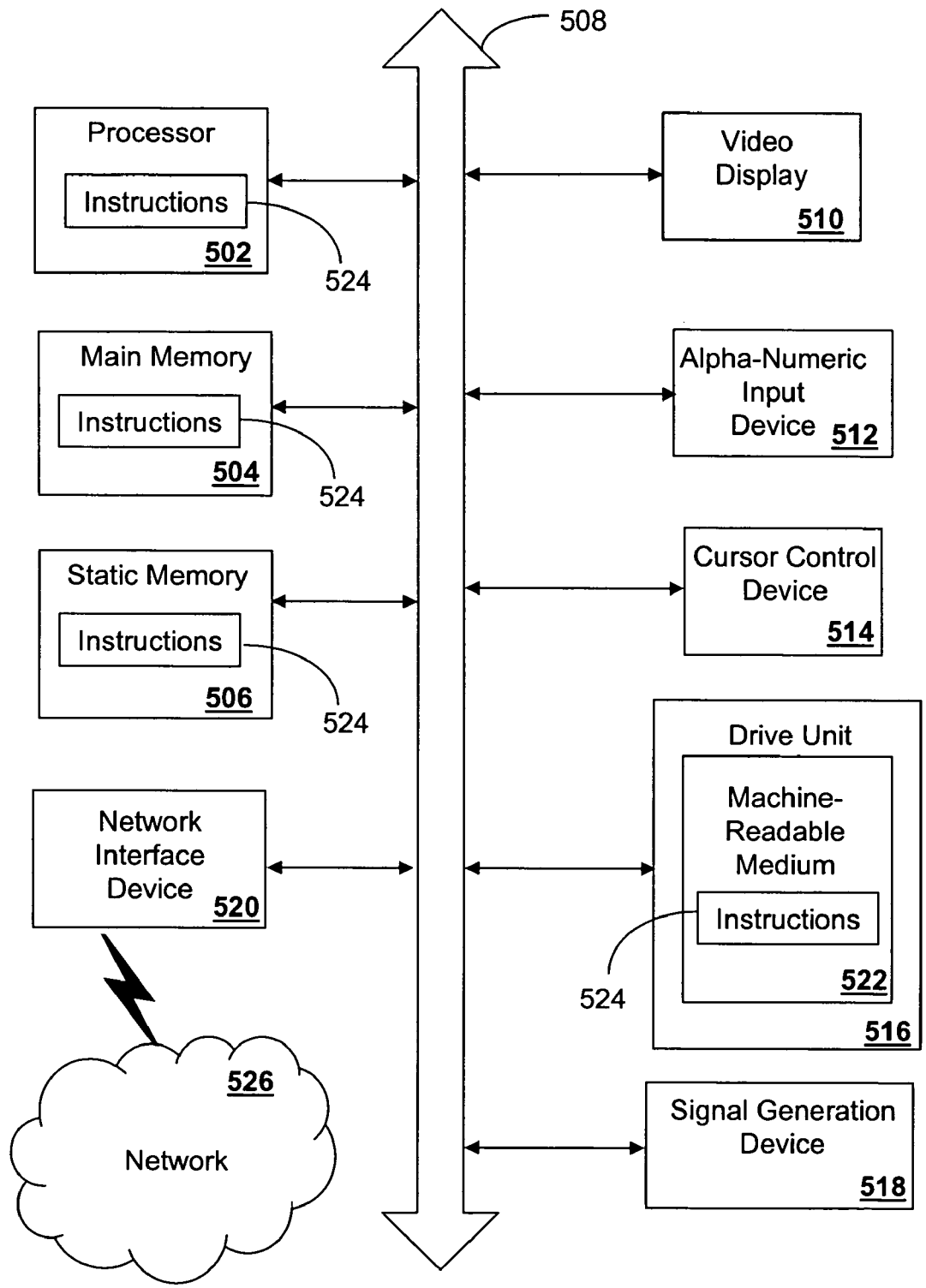
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
providing a full mesh packet network;
applying an isolation protocol to a portion of network elements of the full mesh packet network to create a hierarchical network on the full mesh packet network, the isolation protocol comprising isolating the portion of the network elements from remaining network elements of the full mesh packet network to generate a first end-to-end tunnel;
monitoring for a fault in the hierarchical network; and
establishing a second end-to-end tunnel over the full mesh packet network between first and second customer edge routers using other networks elements of the remaining network elements in response to detecting the fault, wherein the tunnel bypasses the fault, wherein the other network elements are selected in response to detecting the fault, wherein the other network elements had different network connections from the portion of network elements that were replaced.

2. The method of claim 1, comprising connecting the first and second customer edge routers to the full mesh packet network using first and second provider edge routers of the full mesh packet network.

3. The method of claim 2, wherein the hierarchical network has a legacy hierarchy, and wherein the method comprises the step of preserving the legacy hierarchy in the full mesh packet network.

4. The method of claim 1, wherein the isolation protocol comprises a GRE (Generic Routing Encapsulation) tunnel.

5. The method of claim 1, comprising selecting network elements to be used for the hierarchical network that have computing resources which are less than the computing resources of a portion of the remaining network elements.

6. The method of claim 5, wherein the hierarchical network has a legacy hierarchy, and wherein the method comprises the step of preserving the legacy hierarchy in the full mesh packet network.

7. The method of claim 6, wherein the legacy hierarchy comprises an access layer, a distribution layer, and a core layer, and wherein the method comprises the step of exchanging messages between layers by way of GRE tunnels.

8. The method of claim 1, comprising the step of separating routing updates of network elements associated with the hierarchical network from network elements disassociated with the hierarchical network.

9. The method of claim 1, wherein the hierarchical network comprises a virtual private network.

10. A computer readable storage medium encoded with computer executable instructions for:
applying an isolation protocol to a portion of network elements of a full mesh network to create a hierarchical structure on the full mesh network, the isolation protocol comprising isolating the portion of the network elements from remaining network elements of the full mesh network to generate a first end-to-end tunnel;
monitoring for a fault in the hierarchical structure;
establishing a second end-to-end tunnel over the full mesh packet network between first and second edge routers using other networks elements of the remaining network elements in response to detecting the fault, wherein the tunnel bypasses the fault, wherein the other network elements are selected in response to detecting the fault, and wherein the other network elements are selected that have computing resources which are less than the computing resources of a portion of the remaining network elements.

11. The storage medium of claim 10, wherein the full mesh network is a Multi-Protocol Label Switching (MPLS) network and wherein the other network elements had different network connections from the portion of network elements that were replaced.

12. The storage medium of claim 11, wherein the hierarchical network has a legacy hierarchy, and wherein the method comprises the step of preserving the legacy hierarchy in the full mesh MPLS network.

13. The storage medium of claim 10, wherein the isolation protocol comprises a GRE (Generic Routing Encapsulation) tunnel.

14. The storage medium of claim 13, wherein the full mesh network is a Multi-Protocol Label Switching (MPLS) network.

15. The storage medium of claim 10, comprising computer instructions for establishing GRE tunnels as part of the isolation protocol.

16. The storage medium of claim 10, comprising the step of separating communications of network elements associated with the hierarchical structure from network elements disassociated with the hierarchical structure.

17. A server in communication with a full mesh network, comprising a controller programmed to:
apply an isolation protocol to a portion of network elements of the full mesh network to create a hierarchical structure on the full mesh network, the isolation protocol comprising isolating the portion of the network elements from remaining network elements of the full mesh network to generate a first end-to-end tunnel;
select network elements to be used for the hierarchical structure that have computing resources which are less than the computing resources of a portion of the remaining network elements;
monitor for a fault in the hierarchical structure;
establish a second end-to-end tunnel over the full mesh packet network between first and second edge routers using other networks elements of the remaining network elements in response to detecting the fault, wherein the tunnel bypasses the fault, wherein the other network elements are selected in response to detecting the fault, and wherein the other network elements had different network connections from the portion of network elements that were replaced.

18. The server of claim 17, wherein the isolation protocol comprises a GRE tunnel, and wherein the controller is programmed to disassociate itself with network elements not associated with the hierarchical network.

19. The server of claim 17, wherein the network elements comprise at least one among a customer edge router, and a provider edge router.

20. A network, comprising:
a plurality of network elements operably connected to each other in a full mesh configuration;
a server having a controller adapted to:
  apply an isolation protocol to a portion of the network elements to create a hierarchical structure on the full mesh configuration, the isolation protocol comprising isolating the portion of the network elements from remaining network elements of the plurality of network elements to generate a first end-to-end tunnel;
  select one or more of the portion of network elements used for the hierarchical structure which have computing resources which are less than the computing resources of a portion of the remaining network elements;
  monitor for a fault in the hierarchical structure; and
  establish a second end-to-end tunnel between first and second edge routers over the full mesh configuration using other networks elements of the remaining network elements in response to detecting the fault, wherein the tunnel bypasses the fault, wherein the other network elements are selected in response to detecting the fault and wherein the other network elements had different network connections from the portion of network elements that were replaced.

21. The network of claim 20, wherein the isolation protocol comprises a GRE tunnel, and wherein the hierarchical network has a legacy hierarchy that is preserved in the full mesh configuration.

* * * * *